United States Patent [19]
Sutherland et al.

[11] 3,837,143
[45] Sept. 24, 1974

[54] SIMULTANEOUS DRYING AND SWEETENING OF WELLHEAD NATURAL GAS

[75] Inventors: John A. Sutherland, Houston, Tex.; John W. Sweny, River Vale, N.J.

[73] Assignee: Allied Chemical Corporation, New York, N.Y.

[22] Filed: Aug. 6, 1973

[21] Appl. No.: 386,119

[52] U.S. Cl............................. 55/32, 55/68, 55/73
[51] Int. Cl............................................. B01d 53/14
[58] Field of Search............ 55/32, 33, 48, 51, 68, 55/73

[56] References Cited
UNITED STATES PATENTS

| | | | |
|---|---|---|---|
| 3,362,133 | 1/1968 | Kutsher et al. | 55/48 |
| 3,375,639 | 4/1968 | Miller et al. | 55/48 |
| 3,435,590 | 4/1969 | Smith | 55/73 |
| 3,770,622 | 11/1973 | Freireich et al. | 55/68 |

*Primary Examiner*—Charles N. Hart
*Attorney, Agent, or Firm*—Gerard P. Rooney; Patrick L. Henry; Gerhard H. Fuchs

[57] ABSTRACT

Simultaneous dehydration and sweetening of natural gas to produce therefrom a purified natural gas having a low dew point and a low sulfur content suitable for passage in gas transmission lines with concomitant production of hydrogen sulfide gas removed from the natural gas and production of water substantially free of impurities removed from the natural gas involving passing a solvent medium comprising a normally liquid dialkyl ether of a polyalkylene glycol ether containing 2 to 15 percent water by weight in direct contact with the natural gas to reduce its $H_2S$ content to less than 10 parts per million and its water content to less than 12 pounds per million standard cubic feet; stripping the hydrogen sulfide from the solvent medium by means of internally generated steam which is generated by externally heating stripped solvent medium; withdrawing a portion of internally generated steam containing a minor amount of solvent; condensing a portion of it together with contained solvent and returning the steam condensate and contained solvent to the stripping zone; condensing and discharging the remaining portion of withdrawn steam and returning lean solvent medium for stripping of natural gas.

10 Claims, 2 Drawing Figures

SIMULTANEOUS DRYING AND SWEETENING OF WELLHEAD NATURAL GAS

This invention relates to the purification of natural gas and more particularly refers to a new and improved process for the simultaneous removal of water and acid gas contaminants from wellhead gas.

Gas at the wellhead contains connate water, which if not removed can condense as liquid or ice as the gas cools in expansion on leaving the wellhead and entering the gathering lines. Liquid water, under the conditions of temperature and pressure existing in gathering lines, can form hydrocarbon hydrates, solids which can plug the line or its fittings. If acid gases are present along with the liquid water, corrosion of the piping can also occur.

To protect gathering lines, dehydration units are installed at or near the wellhead lines which dehydrate the gas to such an extent that liquid water will not appear; that is, which bring the dew point of the gas to a value below the temperature of the gas flowing in the line. If this is done, no ice or hydrates will form, and no corrosion will occur.

The dehydrating systems most commonly used at wellheads are the liquid systems using diethylene and triethylene glycol. These units dehydrate satisfactorily but they perform only the dehydrating function and nothing more. Although this is sufficient for protection of gathering lines, since dehydration will prevent both plugging and corrosion, it is not sufficient to condition the gas entry to the main gas transmission lines, since the gas still contains acid gas components, particularly hydrogen sulfide. These are removed usually at a central plant before the gas is passed into main transmission lines.

An object of the present invention is to provide a method for complete conditioning of the natural gas at the wellhead, i.e. simultaneous removal of water and hydrogen sulfide to prevent formation of ice or hydrates or corrosion occurring in the lines.

The advantages of complete conditioning of the gas at the wellhead are material. The major gas flow, that of the product, can go directly into a main transmission line without having to be transported first to a central treating plant and then to the transmission line. If it is desired to employ a central Claus plant (for conversion of $H_2S$ to S) to serve several wells, only the small acid gas stream need be transported and that at low pressure instead of full product gas pressure.

In the early development of a gas field, some time may elapse between the drilling of the first wells and the later systematic drilling of the entire field. Only when development is somewhat advanced can adequate and economical central treating facilities be planned and built. Process plants in accordance with the present invention for simultaneously removing of water and hydrogen sulfide sited at individual wells make it possible to readily treat and produce the first wells before central facilities can be planned, and can be moved to other wells as development proceeds.

In accordance with the present invention, complete conditioning of natural gas may be effected at the wellhead to produce therefrom a purified natural gas having a low dew point and a low sulfur content suitable for passage in transmission lines with concomitant production of gas containing hydrogen sulfide (suitable for treatment for conversion to elemental sulfur) removed from the natural gas, and water substantially free of impurities removed from the natural gas by (a) introducing natural gas containing hydrogen sulfide in an amount in excess of 10 parts per million and water in an amount in excess of 12 pounds per million standard cubic feet natural gas into an absorption zone under superatmospheric pressure to about 5000 pounds per square inch, more generally within the range of about 500 – 1500 pounds per square inch absolute, and preferably 800 to 1200 pounds per square inch absolute; (b) introducing as a solvent a normally liquid dialkyl ether of a polyalkylene glycol having one to eight carbon atoms in each alkyl group and three to eight ethylene units, preferably a mixture of dimethyl ethers of polyethylene glycols having three to eight ethylene units, containing 2 to 15 percent water, preferably from 5 to 10 percent water by weight of the solvent medium into the upper section of the absorption zone; (c) passing the solvent medium downwardly countercurrent to and in intimate direct contact with the natural gas to reduce its hydrogen sulfide content to less than 10 parts per million, preferably less than 4 parts per million and its water content to less than 12, preferably less than 7 pounds per million standard cubic feet; (d) discharging the natural gas after contact with the solvent medium for removal of the hydrogen sulfide and water in the absorption zone, said gas being eminently suitable for direct passage to gas transmission lines; (e) passing the solvent medium containing dissolved hydrogen sulfide and water to a stripping zone maintained at a pressure from about 1 to 50 pounds per square inch absolute, preferably about 15 – 20 pounds per square inch absolute; (f) passing a heating medium in indirect contact with stripped solvent medium containing water to heat the solvent medium, preferably to a temperature of about 240° to 280°F., to vaporize the contained water in the solvent, thereby internally generating steam; (g) passing the internally generated steam upwardly countercurrent to and in direct contact with the solvent medium containing dissolved hydrogen sulfide introduced into the stripping zone to effect stripping of the hydrogen sulfide from the solvent medium; (h) releasing hydrogen sulfide together with some water vapor from the stripping zone; (i) cooling the released hydrogen sulfide and water vapor to condense the water vapor and returning the water condensate to the top of the stripping zone to aid in maintaining the temperature at the top of the stripping zone preferably at a temperature of about 200° to 240°F.; (j) discharging the hydrogen sulfide after condensation of the water vapor; (k) withdrawing a portion of internally generated steam containing a minor amount of solvent, preferably an amount of steam equivalent to 110–150 percent of the amount of water absorbed by the solvent medium in the absorption zone; (l) cooling the withdrawn steam to condense a portion of it, preferably about 10–50 percent of said steam, together with the contained solvent; (m) returning the steam condensate and contained solvent to the stripping zone; (n) condensing and discharging the remaining portion of withdrawn steam; and (o) passing solvent medium after stripping of hydrogen sulfide and removal of a portion of its water content to the absorption zone for contact with incoming natural gas and removal of hydrogen sulfide and water therefrom.

In a more specific embodiment the solvent medium containing absorbed hydrogen sulfide is, prior to passage to the stripping zone, passed to a flashing zone maintained at a pressure lower than the pressure in the absorption zone, preferably at a pressure substantially that of the pressure of the stripping zone to about 50 pounds per square inch above that of the stripping zone, to effect liberation of some of the hydrogen sulfide in the solvent medium. The liberated hydrogen sulfide may be combined with the hydrogen sulfide stripped from the stripping zone.

In a further embodiment to obtain a more concentrated hydrogen sulfide gas stream from the process, the rich solvent medium containing hydrogen sulfide and water as well as some dissolved carbon dioxide which was contained in the natural gas is, prior to passage to the stripping zone, passed to a flashing zone maintained at a pressure lower than the pressure in the absorption zone to effect liberation of some of the carbon dioxide and hydrogen sulfide in the solvent medium and the thus liberated carbon dioxide and hydrogen sulfide are returned to the absorption zone. Since the flashing operation preferentially liberates carbon dioxide gas from the solvent medium, the return of the gas to the absorption zone will cause more of the carbon dioxide to pass out of the absorption zone with the product natural gas, with the result that less carbon dioxide will be discharged with the hydrogen sulfide from the stripping zone, thereby resulting in a more concentrated hydrogen sulfide product. A more concentrated hydrogen sulfide gas stream is usually preferred for conversion into elemental sulfur in a Claus plant.

FIG. 1 diagrammatically illustrates one method of carrying out the present invention for removal of water and hydrogen sulfide contaminants from wellhead gas.

FIG. 2 diagrammatically illustrates a modification of the process of FIG. 1 wherein there is produced a more concentrated hydrogen sulfide stream.

Referring to FIG. 1, wellhead natural gas varies in composition depending upon its source but usually contains methane as a principal constituent, together with carbon dioxide, nitrogen and some hydrogen sulfide which latter may vary from a small amount such as 16 parts per million to as much as 5 or more percent. The natural gas is usually saturated with water at its temperature which may range from about 75° to 180°F. Expressed in other terms, the water content of wellhead natural gas may vary from 20 pounds to more than 50 pounds per million standard cubic feet. Unless the water content is reduced to a value of less than 12 pounds, preferably less than 7 pounds water per million standard cubic feet natural gas, difficulties are frequently encountered. In terms of dew point, a natural gas having a dew point of 30°F., preferably 20°F. or lower is generally considered safe for transportation in a pipeline. Dehydrations can be carried out under a wide range of pressures, 15 to 5000 psig but will usually be carried out at pipeline pressures of 500 to 1500 psig., generally near 1000 psig.

The wellhead natural gas is introduced through line 1 into absorber 2 which may be any suitable tower filled with packing, such as Pall ring packing, or perforated plates, preferably valve trays to ensure good contact between liquid and gas in the tower. The solvent medium entering the top of absorber 2 through line 3 is a normally liquid dialkyl ether of a polyalkylene glycol, preferably a dialkyl ether of a polyethylene glycol having one to eight carbon atoms in each alkyl group and three to eight ethylene units, desirably the alkyls are methyl and the solvent is a mixture of the dimethyl ethers of polyethylene glycols. The solvent medium contains an appreciable amount of water, 2 to 20 percent, preferably from 5 to 10 percent water by weight of the solvent medium. It is important that the solvent medium contains an appreciable amount of water, sufficient to permit internally generating steam to strip the hydrogen sulfide gas contained in the rich solvent in the stripping zone and to avoid the introduction of steam or other gaseous fluids as will be more fully explained later in connection with the stripping operation.

The temperature at the top of the absorption tower 2 is maintained at about 20°–100°F., preferably 30°–50°F. with the temperature at the bottom of the absorption tower maintained at about 5° to 20° higher than the top temperature. Solvent medium is introduced through line 3 into tower 2 at a rate sufficient to reduce the content of hydrogen sulfide in the natural gas to less than 10 parts per million, preferably less than 4 parts per million and to reduce the water content of the natural gas to less than 12 pounds per million standard cubic feet, preferably less than 7 pounds per million standard cubic feet.

Solvent circulation rates required for a given dew point will vary with pressure and temperature of the natural feed gas, the temperature and water content of the solvent, and the equilibrium stages in the absorber. Satisfactory conditioning of wellhead gas containing moderate amounts of $H_2S$ and water will usually be accomplished by circulating 0.005 to 0.05 gallons of solvent medium per standard cubic foot of natural gas.

Product natural gas reduced in hydrogen sulfide content to less than 10 parts per million and in water content to less than 12 pounds per million standard cubic feet is released from the top of absorber 2 through line 4 and may be sent directly into a main transmission line without having to be transported first to a central treating plant and then to a transmission line. From the bottom of absorber 2, rich solvent containing the hydrogen sulfide and water from the natural gas entering through line 1 discharges through line 5 into the top of stripper column 6, which may be any suitable packed tower or valve tray tower similar in construction to absorber column 1. Regeneration of the solvent medium is accomplished by heating and depressuring in stripper column 6. Pressure may be in the range of 1 psig to 50 psig, but will generally be about 15 to 20 psig. Temperature of stripping can be 200°F. to 400°F., but will generally be between 240°F. and 280°F., varying with pressure and desired water content of the dehydrating solvent medium.

An important feature of the present invention is the internal generation of steam from stripped solvent, which internally generated steam is employed as the stripping means for removal of hydrogen sulfide gas from solvent medium entering into the stripping column through line 5. This feature particularly in combination with withdrawal of a portion of the internally generated steam through line 7, partial condensation of the withdrawn steam in partial condenser 8 together with any solvent medium that may be carried over, and return of the condensate and solvent medium through line 9, pump 11 and line 12 into stripper column 6 with condensation of the uncondensed steam from partial condenser 8 through line 13, total condenser 14. In this manner, water substantially equal in amount to the water removed by the solvent medium in absorber 2 is discharged from total condenser 14 through line 15, pump 16 and line 17. The water condensate discharged through line 17 is substantially free of impurities except possibly slight amounts of hydrogen sulfide, which may be readily removed by conventional means.

In stripper 6, as previously mentioned, internally generated steam rises upwardly countercurrent to the flow of rich liquid entering through line 5 with removal of the hydrogen sulfide contained in the rich liquid. The hydrogen sulfide gas together with some water vapor is released from the top of stripper 6 through line 18 thence to main condenser 19 wherein vapor is condensed and returned through line 21 to the top of stripper 6. The return of this condensate through line 21 may also serve to regulate the temperature at the top of stripper 6 which is desirably maintained at 200° – 240°F.

The hydrogen sulfide discharged from the system through line 22 may be directed to a Claus plant for conversion to elemental sulfur.

The rich liquid entering stripper 6 through line 5 is in its passage downwardly, countercurrent to steam, stripped or denuded of its hydrogen sulfide content and by the time it reaches the bottom of stripper 6 it contains only a minor amount of hydrogen sulfide, a trace in the order of about 10 – 50 parts per million. It is important, however, that this stripped solvent medium contain an appreciable amount of water, at least 2 percent and preferably from 5 to 10 percent by weight water based on the solvent medium. Steam stripping of the gas is more effective at lower pressure and therefore stripper 6 is operated desirably at a pressure of 1 – 50 psia, preferably 15 – 20 psia. The steam not only strips the hydrogen sulfide from the rich solvent but also carbon dioxide and mercaptans which may be present in the rich solvent. Heat is supplied to the stripped solvent medium by indirect heat exchange with the heating medium to generate steam internally for stripping of the rich liquid. This may take the form of a reboiler 23 through which a heating medium such as steam or hot oil is introduced through line 24 and discharges through line 25 after passing in indirect heat exchange with solvent medium flowing from the bottom of stripper 6 through line 26, thence through reboiler 23 and returning in the form of liquid and steam through line 27 into stripper 6. A kettle type reboiler may be used in lieu of thermosyphon reboiler 23.

Excess water is advantageously removed in the form of steam at the bottom of the stripper 6 since at this point steam vapors will contain only minor quantities of the acid solute. If a kettle reboiler is used, vapor can be withdrawn from its shell, but if a thermosyphon reboiler 23 shown in the drawing is used, vapor should be withdrawn from the base of stripper 6 which serves as a vapor-liquid disengagement vessel. An amount of steam is withdrawn from stripper 6 through line 7 which is equal to the water removed from the feed gas in absorber 2 plus 10 to 50 percent, preferably 10 to 20 percent. The 10 – 20 percent excess is condensed in partial condenser 8 and returned to stripper 6 via line 9, pump 11 and line 12. This condensate carries with it all the solvent in the vapor withdrawn, so that the final condensate will not contain solvent and there will be no loss of solvent from the system. The remaining vapor is then totally condensed in total condenser 14. This stream will contain no $CO_2$ and no solvent. It may contain a slight amount of hydrogen sulfide depending on how completely it is desired to strip the lean liquid. This slight amount of hydrogen sulfide in the condensate which as illustrative may be 10 – 100 parts per million hydrogen sulfide, may be readily removed by conventional means or may be neutralized simply by passing through a tower containing lime.

In a modified form of operation, the rich liquid withdrawn from the bottom of absorber 2 through line 5 may first be partially regenerated by flashing, i.e., passing into a chamber (not shown in FIG. 1) at reduced pressure to liberate some of the gases from the rich liquid prior to entering stripper 6. The liberated gases may be combined with the acid gases discharging through line 22. The liquid from the flashing would then enter stripper 2 and be treated in a manner as hereinbefore described.

FIG. 2 is a preferred modification of the present invention for treating wellhead natural gas containing a higher percentage of hydrogen sulfide and producing a concentrated hydrogen sulfide gas. Referring to FIG. 2, wellhead natural gas is introduced through feed line 28 into an absorber which is constructed and operates in a manner similar to absorber 2 of FIG. 1. The gas is scrubbed with solvent medium entering through line 31, cooler 32, line 33 into the top of absorber 29 where it passes downwardly countercurrent to the feed entering through line 28 to remove from the gas the hydrogen sulfide and water content to produce a product gas discharging through line 34 containing less than 10 parts per million, preferably less than 4 parts per million hydrogen sulfide and less than 12 pounds, preferably less than 7 pounds water per million standard cubic feet, suitable for direct passage into transmission pipelines.

Rich liquid containing dissolved hydrogen sulfide, carbon dioxide and minor amounts of other gases such as methane, are withdrawn from the bottom of absorber 29 through line 35 and directed to flash tower 36 maintained at a pressure lower than the pressure maintained in absorber 29, preferably a pressure of 50 to 500 pounds, desirably 1 – 200 pounds lower than the pressure in absorber 29. Liberated gases in flash vessel 36 are released through line 37 and forced by compressor 38 through line 39 back into absorber 29. The liquid from flash chamber 36 is withdrawn through line 41 and introduced into a second flash tank 42 maintained at a lower pressure than the pressure in vessel 36, preferably a pressure of 1 to 700 pounds lower than that in vessel 36. The gases released from flash tank 42 flows through line 43 into compressor 38 and thence through line 39 into absorber 29.

The rich liquid after liberation of some vapors in flash tanks 36 and 42 is withdrawn through line 44, passed in heat exchange with lean solvent medium flowing through line 31 in heat exchanger 45 and then introduced into the top of stripper column 46. Stripper column 46 is similar in construction and operation to stripper column 6 of FIG. 1. The rich liquid passing downwardly through column 46 is stripped of its acid gas which is released through line 47 then through main condenser 48 to condense vapors which are returned through line 49 to the top of stripper column 46. The acid gas is discharged through line 51 and may be sent to a Claus unit for conversion to elemental sulfur.

Stripped solvent medium collecting in the bottom of column 46 is in part withdrawn through line 52 and thence passed through reboiler 53 in indirect heat exchange with a heating medium such as steam entering through line 54 and discharging through line 55. The internally generated steam together with some solvent liquid is returned from reboiler 53 through line 56 into stripper 46 wherein the steam separates and passes upwardly as a stripping medium for removal of acid gas from the entering rich liquid. Lean solvent medium is withdrawn from the bottom of stripper 46 through line 57 and forced by pump 58 through heat exchanger 45, line 31, cooler 32, line 33 into the top of absorber 29.

A portion of the internally generated steam, generally an amount equivalent to about 110 – 150 percent of the amount of water removed in absorber 29 is withdrawn from stripper 46 through line 59, cooled in partial condenser 61 to condense about 10 to 50 percent of the steam and the condensate is returned via line 62 and pump 63 to stripper 46. The remaining steam passes through line 64 into total condenser 65 and thence the condensate flows through line 66 and is discharged from the system by means of pump 67 through line 68. The condensate is approximately equal in amount to that removed from the gas in absorber 29 and is substantially pure water except for possibly a slight amount of hydrogen sulfide.

The following examples illustrate the present invention.

EXAMPLE 1

In an operation as illustrated in FIG. 1, the wellhead natural gas feed contains a small amount of hydrogen sulfide, 16 parts per million, and is saturated with water at 86°F. The water content of the feed is 32 pounds per million standard cubic feet. After treatment the wellhead natural gas product was reduced to a hydrogen sulfide content of 2 parts per million along with a dew point of −5°C. (23°F.) under 1400 pounds per square inch absolute.

The natural gas feed of the composition tabulated below enters the absorber saturated with water at 1400 psi and 86°F. It is scrubbed with 41 gallons per minute of solvent medium, a mixture of dimethyl ethers of ethylene glycol and 5 weight percent water. The inlet temperature of the lean solvent medium is 40°F. and the rich solvent medium discharges from the absorber at 85°F. The product contains 2 parts per million of $H_2S$ and has a water dew point of 1400 psi at −5°C., eminently suitable for direct transfer to gas transmission lines. The solvent is regenerated by stripping with steam, generated in a reboiler which heats stripper bottoms, which then, after cooling in a heat exchanger and cooler, becomes a lean solvent stream to the absorber.

Steam is withdrawn from the base of the stripping column in an amount of 120 percent of the water absorbed from the entering gas in the absorber. Twenty percent of this steam is condensed by partial condensation and the condensate returned to the stripper. The remaining steam is totally condensed and discharged from the system. It is substantially pure water containing as impurity only about 75 parts per million $H_2S$.

The tabulation below gives the composition of the feed and product.

|  | FEED (Lb-mols/hr) | | PRODUCT (Lb-mols/hr) | |
| --- | --- | --- | --- | --- |
| $N_2+H_2$ | 42.1 | | 41.9 | |
| $CH_4$ | 888.9 | | 873.3 | |
| $C_2^+$ | 4.7 | | 1.22 | |
| $CO_2$ | 46.0 | | 39.0 | |
| $H_2S$ | .0157 | (16 ppmv) | .0019 | (2 ppmv) |
| RSH | .0012 | | .0001 | |
| | 981.7 | | 955.4 | |

EXAMPLE 2

In this example, a larger amount of $H_2S$ is removed and concentrated to make a suitable Claus plant feed, while simultaneously drying the gas to the same dew point specification as above, i.e. −5°C. at 1400 psi equivalent to 4 pounds water per million standard cubic feet.

The feed and product streams are as follows:

|  | FEED (Mols/hr) | | PRODUCT (Mols/hr) | | OFF-GAS (Mols/hr) | |
| --- | --- | --- | --- | --- | --- | --- |
| $N_2$ | 126. | | 126. | | — | |
| $CH_4$ | 801.4 | | 799.7 | | 1.71 | |
| $C_2^+$ | 4.58 | | 4.05 | | .53 | |
| $CO_2$ | 43.7 | | 37.5 | | 6.2 | |
| $H_2S$ | 6.19 | (6300 ppmv) | .002 | (2 ppmv) | 6.18 | (42%) |
| RSH | .065 | | .0006 | | .0644 | |
| COS | .014 | | .008 | | .0060 | |
| | 981.95 | | 967.26 | | 14.69 | |

The feed is saturated with water at 86°F. (32 lbs/mmscf).

In an operation as illustrated in FIG. 2, feed of the above composition enters the absorber saturated with water at 1400 psia and 86°F. It is scrubbed with 54 gpm of solvent medium as in Example 1, containing 5 weight percent water (inlet temperature 40°F; outlet temperature 85°F.). The product contains 2 ppmv of $H_2S$ and has the required water dew point at 1400 psia of −5°C. Mercaptans and COS are also removed to a satisfactory degree.

Solvent is regenerated first by flashing at two pressure levels, 800 psia and 150 psia. The flashed gases are recompressed and routed back to the absorber. This is done to reduce the quantity of $CO_2$ which would otherwise pass into the Claus gas; the result being that a very satisfactory Claus gas containing 42 percent $H_2S$ is produced.

Regeneration of the solvent is completed by stripping with steam, generated in a reboiler which heats stripper bottoms, which then, after cooling in a heat exchanger and cooler, becomes the lean solvent stream to the absorber.

We claim:
1. A process for simultaneous dehydration and sweetening of natural gas to produce therefrom a purified natural gas having a low dew point and a low sulfur content suitable for passage in gas transmission lines with concomitant production of hydrogen sulfide gas removed from the natural gas and production of water substantially free of impurities removed from the natural gas which comprises:
   a. introducing natural gas containing hydrogen sulfide in an amount in excess of 10 parts per million and water in an amount in excess of 12 pounds per million standard cubic feet natural gas into an absorption zone maintained under superatomspheric pressure;
   b. introducing as a solvent medium a normally liquid dialkyl ether of a polyalkylene glycol ether containing 2 to 15 percent water by weight of the solvent medium into the absorption zone;
   c. passing the solvent medium downwardly countercurrent to and in intimate direct contact with the natural gas to reduce its hydrogen sulfide content to less than 10 parts per million and its water content to less than 12 pounds per million standard cubic feet;
   d. discharging the natural gas after removal of the hydrogen sulfide and water from the absorption zone;
   e. passing the solvent medium containing dissolved hydrogen sulfide and water to a stripping zone maintained at a pressure from about 1 to 50 pounds per square inch absolute;
   f. passing a heating medium in indirect contact with stripped solvent medium containing water to heat the solvent medium to vaporize the contained water thereby internally generating steam;
   g. passing the internally generated steam upwardly countercurrent to and in direct contact with the solvent medium containing dissolved hydrogen sulfide introduced into the stripping zone to effect stripping of the hydrogen sulfide from the solvent medium;
   h. discharging hydrogen sulfide from the stripping zone;
   i. withdrawing a portion of internally generated steam containing a minor amount of solvent;
   j. cooling the withdrawn steam to condense a portion of it together with contained solvent;
   k. returning the steam condensate and contained solvent to the stripping zone;
   l. condensing and discharging the remaining portion of withdrawn steam; and
   m. passing solvent medium after stripping of hydrogen sulfide and removal of a portion of its water content to the absorption zone for contact with incoming natural gas and removal of hydrogen sulfide and water therefrom.

2. A process as claimed in claim 1 wherein the absorption zone is maintained at a pressure between 500 and 1500 pounds per square inch absolute and the temperature at the top of the absorption zone is maintained at 20° – 100°F. with the temperature at the bottom of the absorption zone maintained at about 5° to 20° higher than the top temperature.

3. A process as claimed in claim 1 wherein solvent medium introduced into the absorption zone contains from 5 to 10 percent water by weight of the solvent medium.

4. A process as claimed in claim 1 wherein the solvent medium is introduced into the absorption zone at a rate sufficient to reduce the hydrogen sulfide content in the natural gas to less than 4 parts per million and the water content in the natural gas to less than 7 pounds per million standard cubic feet.

5. A process as claimed in claim 1 wherein the stripping zone is maintained at a pressure of 15 – 20 pounds per square inch absolute with a top temperature of from about 200° to 240°F. and the bottom temperature of from about 240° to 280°F.

6. A process as claimed in claim 1 wherein the solvent is a mixture of dimethyl ethers of polyethylene glycols having three to eight ethylene units.

7. A process as claimed in claim 1 wherein the solvent medium containing absorbed hydrogen sulfide is prior to passage to the stripping zone, passed to a flashing zone maintained at a pressure lower than the pressure in the absorption zone to effect liberation of some of the gas in the solvent medium.

8. A process as claimed in claim 1 wherein the natural gas introduced into the absorption zone also contains carbon dioxide which also dissolves in the solvent medium and wherein solvent medium containing dissolved carbon dioxide and hydrogen sulfide is prior to passage to the stripping zone passed to a flashing zone maintained at a pressure lower than the pressure in the absorption zone to effect liberation of some of the carbon dioxide and hydrogen sulfide in the solvent medium, and wherein the thus liberated carbon dioxide and hydrogen sulfide are returned to the absorption zone.

9. A process as claimed in claim 1 wherein the withdrawn portion of internally generated steam is equivalent in amount to 110–150 percent of the amount of water absorbed by the solvent medium in the absorption zone and wherein said withdrawn steam is cooled to partially condense 10 – 50 percent of said steam.

10. A process for simultaneous dehydration and sweetening of natural gas to produce therefrom a purified natural gas having a low dew point and a low sulfur content suitable for passage in gas transmission lines with concomitant production of gas containing a high concentration of hydrogen sulfide removed from the natural gas and production of water substantially free of impurities removed from the natural gas which comprises:
   a. introducing natural gas containing carbon dioxide, hydrogen sulfide in an amount in excess of 10 parts per million and water in an amount in excess of 12 pounds per million standard cubic feet natural gas into an absorption zone maintained under superatmospheric pressure;
   b. introducing as a solvent medium a normally liquid dialkyl ether of a polyalkylene glycol ehter ether 2 to 15 percent water by weight of the solvent medium into the absorption zone;
   c. passing the solvent medium downwardly countercurrent to and in intimate contact with the natural gas to reduce its hydrogen sulfide content to less than 10 parts per million and its water content to less than 12 parts per million standard cubic feet and also to dissolve some carbon dioxide contained in the natural gas;
   d. discharging the natural gas after removal of the hydrogen sulfide and water from the absorption zone;

e. passing the solvent medium containing dissolved gases from the absorption zone to a flashing zone maintained at a pressure lower than the pressure in the absorption zone to effect liberation of carbon dioxide together with some hydrogen sulfide;

f. returning the thus liberated carbon dioxide and hydrogen sulfide to the absorption zone;

g. passing the solvent medium containing dissolved hydrogen sulfide and water from the flashing zone to a stripping zone maintained at a pressure from about 1 to 50 pounds per square inch absolute;

h. passing a heating medium in indirect contact with stripped solvent medium containing water to heat the solvent medium to vaporize the contained water thereby internally generating steam;

i. passing the internally generated steam upwardly countercurrent to and in direct contact with solvent medium containing dissolved hydrogen sulfide introduced into the stripping zone to effect stripping of the hydrogen sulfide from the solvent;

j. cooling said hydrogen sulfide to condense any water vapor contained therein and returning said condensate to the stripper;

k. discharging the cooled gas having a high concentration of hydrogen sulfide;

l. withdrawing a portion of internally generated steam containing a minor amount of solvent, said amount of steam being equivalent to 110 – 150 percent of the amount of water absorbed by the solvent medium in the absorption zone;

m. cooling the withdrawn steam to condense 10 – 50 percent of said steam together with contained solvent;

n. returning the steam condensate and contained solvent to the stripping zone;

o. condensing and discharging the remaining portion of withdrawn steam;

p. passing solvent medium after stripping of hydrogen sulfide and removal of a portion of its water content to the absorption zone for contact with incoming natural gas and removal of hydrogen sulfide and water therefrom.

* * * * *

UNITED STATES PATENT OFFICE
CERTIFICATE OF CORRECTION

Patent No. 3,837,143    Dated September 24, 1974

Inventor(s) John A. Sutherland and John W. Sweny

It is certified that error appears in the above-identified patent and that said Letters Patent are hereby corrected as shown below:

Column 10, line 55, Claim 10(b), "ehter" should be deleted and after "ether" -- containing should be inserted.

Signed and sealed this 1st day of April 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,837,143     Dated September 24, 1974

Inventor(s) John A. Sutherland and John W. Sweny

It is certified that error appears in the above-identified patent and that said Letters Patent are hereby corrected as shown below:

ABSTRACT

Line 9, "ether" should be omitted.

CLAIMS

Figure 1:
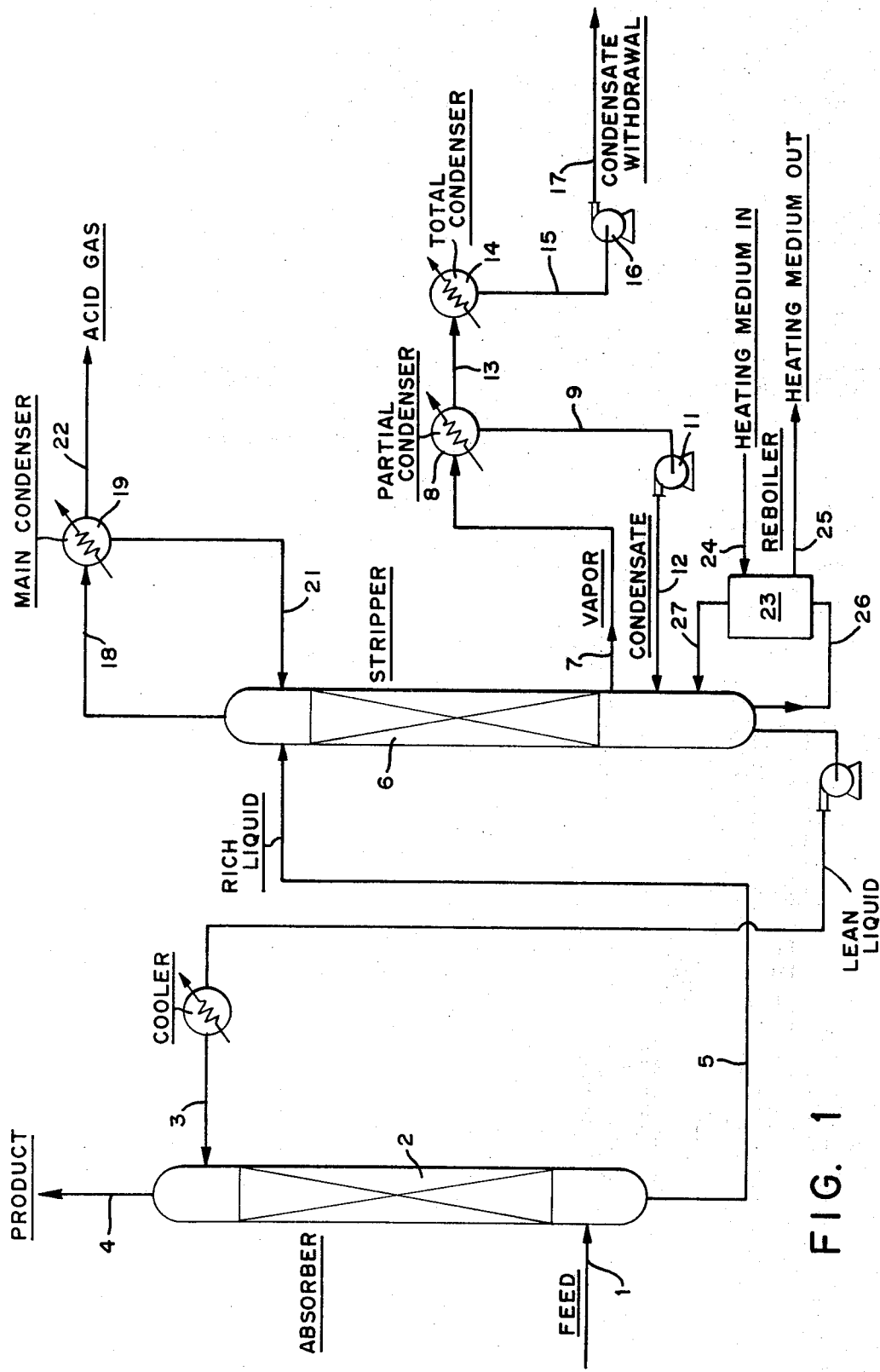
Figure 2:
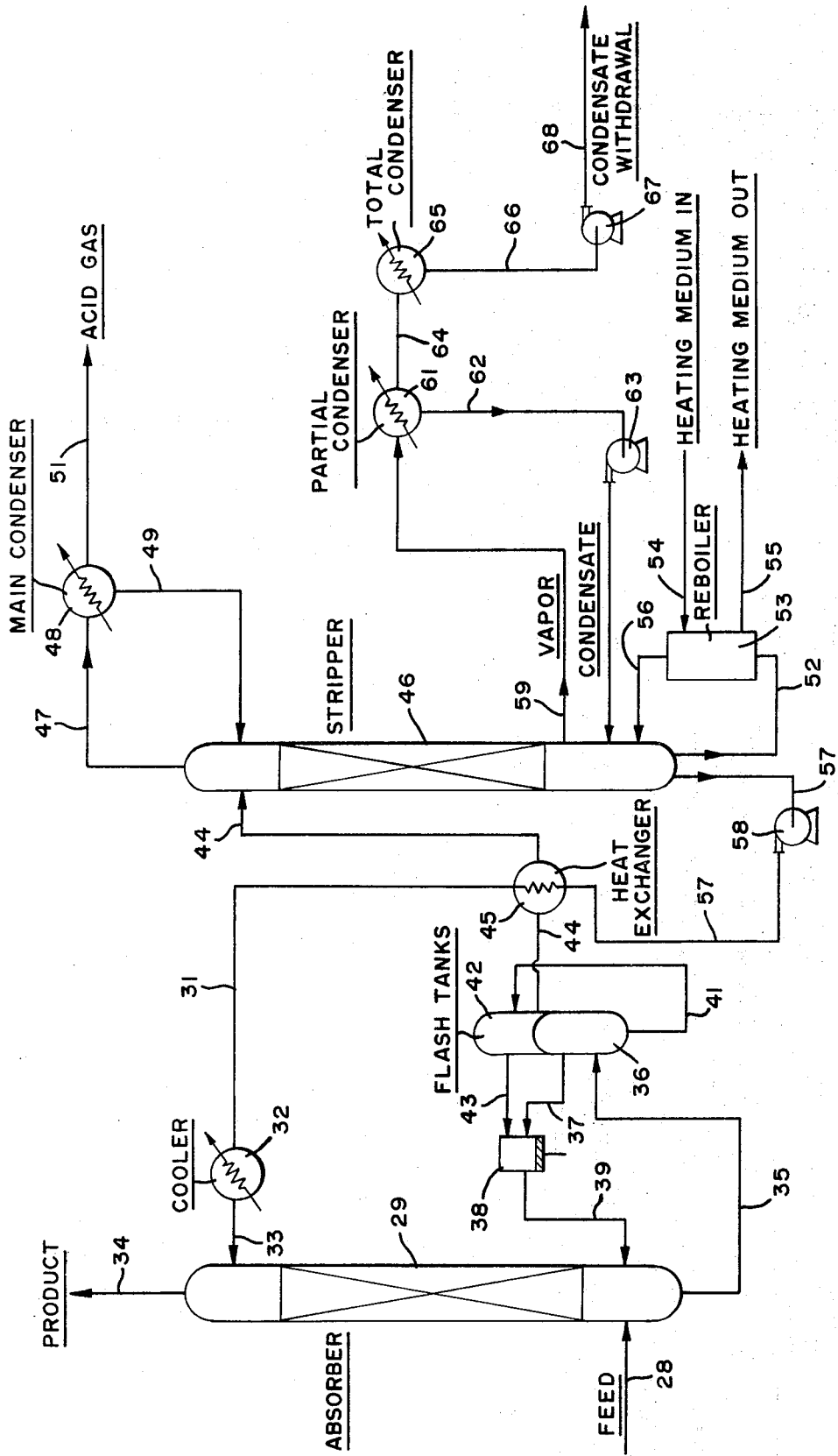

Claim 1(b), column 9, line 17, "ether" should be omitted.

Claim 10(b), column 10, line 55, "enter" should be omitted.

Claim 10(b), column 10, line 55, "ether" should be omitted.

Claim 10(b), column 10, line 55, after glycol, should read --containing--.

This certificate supersedes Certificate of Correction issued April 1, 1975.

Signed and Sealed this twenty-eight Day of October 1975

[SEAL]

Attest:

RUTH C. MASON
Attesting Officer

C. MARSHALL DANN
Commissioner of Patents and Trademarks